March 16, 1926.

T. W. SHELLEY 1,577,374

GUM OR CANDY CONTAINER

Filed Nov. 5, 1921

INVENTOR
Thomas W. Shelley
BY James R Townsend
his ATTORNEY

Patented Mar. 16, 1926.

1,577,374

UNITED STATES PATENT OFFICE.

THOMAS W. SHELLEY, OF LOS ANGELES, CALIFORNIA, ASSIGNOR TO JOHN L. TIMMINS, OF LOS ANGELES, CALIFORNIA, BY COURT ORDER ASSIGNED TO MARGARET TIMMINS, WIDOW OF SAID JOHN L. TIMMINS, DECEASED.

GUM OR CANDY CONTAINER.

Application filed November 5, 1921. Serial No. 513,000.

*To all whom it may concern:*

Be it known that I, THOMAS W. SHELLEY, a citizen of the United States, residing in the city and county of Los Angeles, and State of California, have invented new and useful Improvements in a Gum or Candy Container Used in Conjunction with a Gum or Candy-Vender Machine, of which the following is a specification.

By reference to the drawings, you note that my invention consists of a special shaped gum or candy container, its bottom compartment being globe shaped, with a square compartment located directly above said globe compartment, formed on the upper end of said square compartment is a circular collar which receives a standard make of circular cap.

The object of my invention is to provide a suitable gum or candy container that can be used in conjunction with a gum or candy vender machine, having a lower compartment for holding gum, candy or the like and an upper compartment so constructed and shaped as to suitably hold advertising cards or the like and having the top of said gum container so shaped as to receive a standard circular shaped cap or cover.

An object of this invention is to provide a novel translucent container which may be used in combination with a vending machine to contain articles to be vended and to hold advertising cards or the like.

Another object is to construct a novel container having various communicating compartments that are adapted to contain articles to be vended and to display advertising cards.

Advantages are ease of accessibility for replenishing the supply of articles to be vended, and for removing or inserting the advertising cards; and protection of the cards from the weather.

Further objects of my invention will hereinafter appear.

My invention consists of its general shape, construction etc., and will hereinafter be more fully described and claimed, having reference to the accompanying drawings in which—

Figures 1, 2:
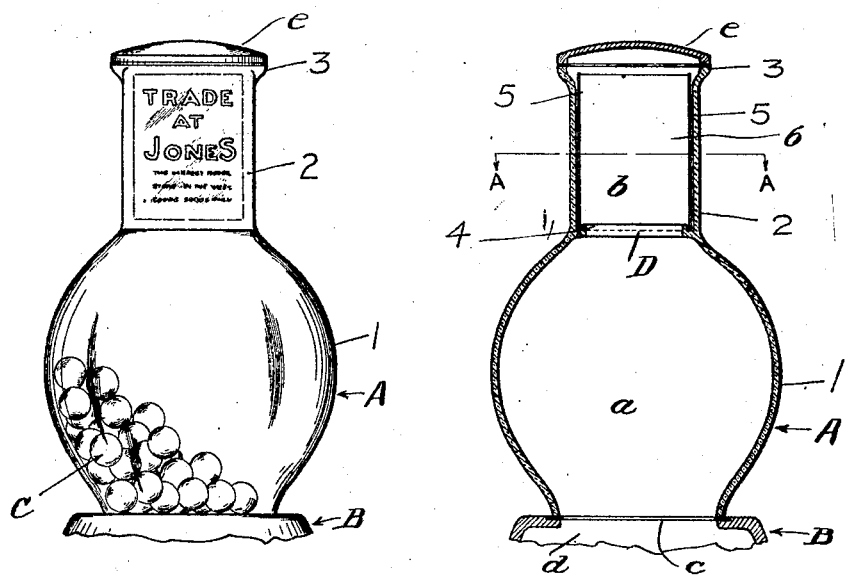
Figure 1 is an exterior elevation of one side of the gum container.
Figure 2 is vertical cross section of the entire gum container.
Figures 3, 4:
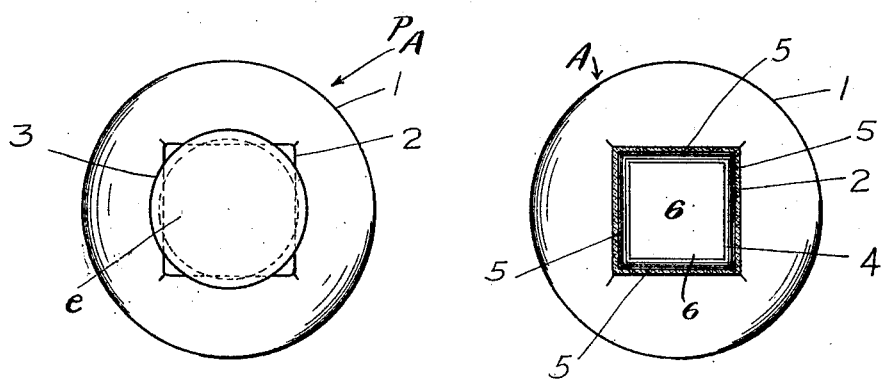
Figure 3 is a top plan of the gum container.
Figure 4 is a sectional plan and elevation taking through a point marked "A—A" on Figure 2.

The translucent container A is preferably made of glass or other transparent material and is mounted upon and is adapted to be used in combination with any standard vending machine B a fragment of which is shown and that is adapted to vend gum, candy, peanuts, or other similar articles indicated as at C.

The container A comprises compartments *a*, *b* of different configurations or outline and has a lower globe shaped compartment *a* formed by the walls 1 and an upper square or rectangular shaped compartment *b* formed by the walls 2, said lower globe shaped compartment is in communication with the upper square shaped compartment as at D, and houses the articles to be vended, such as gum or candy, and the like, and has a circular opening *c* at its lower end that communicates with the chamber *d* of the vending machine. The center of the square or rectangular compartment *b* is directly over the center of the lower compartment, but it is obvious that the compartments may be offset from the center line if so desired.

The upper or outer ends of the walls 2 are shaped to form a circular collar 3 that is adapted to receive a standard circular cap or cover *e*.

The walls 2 are provided on the inside thereof and at the lower ends or at approximately the point of joinder with the walls 1, with a grooved flange 4 that extends across the inner side of the four walls 2 of the square shaped upper compartment *b*. The groove in said flange 4 is continuous around the compartment and is adapted to receive the lower edge of the advertising cards 5 which fit securely into the groove of the flange and are thereby maintained in place or in mounted position.

The cards 5 are held in approximate parallelism with the walls 2 and leave an opening 6 therethrough through which the supply of articles to be vended from the lower compartment may be easily replenished after removal of the cap or cover *e*.

Although I have shown and described my invention as being preferably made of glass and adapted for use with standard gum vending machines, I do not limit my invention to the above material or the above use.

Having thus described my invention, what I claim and desire to secure by Letters Patent is:

1. A container adapted for use in combination with a vending machine and comprising a lower globe shaped compartment open at both ends and adapted to contain articles to be vended; and an upper square or rectangular shaped compartment the center of which is directly over the center of the lower globe shaped compartment.

2. A gum or candy container having the combination of a lower globe shaped compartment for housing gum or the like the bottom of the same being provided with a circular opening, said container being also provided with a square or rectangular compartment directly over the center of said globe shaped compartment, said square or rectangular compartment having a circular collar formed on its upper end.

3. A container comprising a lower globular compartment open at both ends and an upper square or rectangular compartment, said lower compartment being adapted to hold articles such as gum and candy or the like, and said upper compartment being adapted to display advertisements.

4. The combination with a vending machine, of a container comprising walls forming a lower compartment opening into said vending machine and adapted to hold articles to be vended; walls forming an upper compartment opening into said lower compartment; and means on the walls of said upper compartment adapted to hold display advertising cards in place.

5. The combination with a vending machine, of a container comprising walls forming a lower compartment opening into said vending machine and adapted to hold articles to be vended; walls forming an upper compartment opening into said lower compartment, said last mentioned walls being shaped to form a circular collar at their upper ends; means on the walls of said upper compartment adapted to hold display advertising cards in place; and a cover on said collar.

6. A container comprising compartments of different capacities and outlines, said compartments being in open communication with each other and being open at their ends opposite said communicating opening.

7. A container comprising compartments of different capacities and outlines, said compartments being in open communication with each other and being open at their ends opposite said communicating opening; and means in one of said compartments to hold advertising cards in place.

8. A container having a lower globe shaped compartment for housing articles to be vended, and having an upper square or rectangular shaped compartment in open communication with said lower compartment, said compartments being open at their ends opposite the communicating opening; and a grooved flange at the lower end of said upper compartment for holding cards.

9. A container having a lower globe shaped compartment for housing articles to be vended, and having an upper square or rectangular shaped compartment in open communication with said lower compartment, said compartments being open at their ends opposite the communicating opening; a grooved flange at the lower end of said upper compartment for holding cards; and a circular collar formed on the upper end of said upper compartment.

10. A container having a lower globe shaped compartment for housing articles to be vended, and having an upper square or rectangular shaped compartment in open communication with said lower compartment, said compartments being open at their ends opposite the communicating opening; a grooved flange at the lower end of said upper compartment for holding cards; a circular collar formed on the upper end of said upper compartment; and a cover on said collar.

11. A container comprising a lower globular compartment and an upper square or rectangular compartment, said compartments being open at their ends and into each other.

12. A container comprising a lower globular compartment and an upper square or rectangular compartment, said compartments being open at their ends and into each other; and means in one of said compartments adapted to hold advertising cards.

13. A container comprising a lower globular compartment and an upper square or rectangular compartment, said compartments being open at their ends and into each other; said upper compartment having a circular collar formed on its upper end; a cover adapted to fit on said circular collar; and means in one of said compartments adapted to hold advertising cards.

14. A container comprising a lower globular compartment and an upper square or rectangular compartment, said compartments being open at their ends and into each other; and a grooved flange to hold display cards in one of said compartments.

THOMAS W. SHELLEY.